US008537067B2

(12) United States Patent  
Tahmisian, Jr. et al.

(10) Patent No.: US 8,537,067 B2  
(45) Date of Patent: Sep. 17, 2013

(54) SMALL APERTURE INTERROGATOR ANTENNA SYSTEM EMPLOYING SUM DIFFERENCE AZIMUTH DISCRIMINATION TECHNIQUES

(75) Inventors: Theodore N. Tahmisian, Jr., Columbia City, IN (US); Charles A. Hall, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 475 days.

(21) Appl. No.: 12/431,196

(22) Filed: Apr. 28, 2009

(65) Prior Publication Data

US 2009/0267852 A1 Oct. 29, 2009

Related U.S. Application Data

(60) Provisional application No. 61/048,760, filed on Apr. 29, 2008.

(51) Int. Cl.  
*H01Q 13/00* (2006.01)

(52) U.S. Cl.  
USPC ............................ 343/776; 343/786; 343/772

(58) Field of Classification Search  
USPC ................................................. 343/786, 776  
See application file for complete search history.

(56) References Cited

U.S. PATENT DOCUMENTS

| 2,530,694 | A | | 11/1950 | Gutton et al. | |
|---|---|---|---|---|---|
| 3,090,951 | A | * | 5/1963 | Mieher | 342/80 |
| 3,196,444 | A | | 7/1965 | Shin | |
| 3,883,877 | A | * | 5/1975 | Chabah et al. | 343/778 |
| 7,030,813 | B1 | * | 4/2006 | Lopez | 342/427 |

FOREIGN PATENT DOCUMENTS

| EP | 0 025 264 | 3/1981 |
|---|---|---|
| EP | 0 101 533 | 2/1984 |
| EP | 0 651 462 | 5/1995 |
| JP | 56-70480 | 6/1981 |

OTHER PUBLICATIONS

"Optimum Feeds for All Three Modes of a Monopulse Antenna I: Theory," Peter Hannan, IRE Transactions on Antennas and Propagation, vol. 9, Issue 5, 1961, pp. 444-454.*

"Fourier Transforms in Aperture Antenna Theory," Antenna Theory Analysis and Design, Third Edition, Constantine Balanis, John Wiley and Sons, New Jersey, 2005, pp. 701 to 712 and 726 to 727.*

(Continued)

*Primary Examiner* — Jacob Y Choi  
*Assistant Examiner* — Graham Smith  
(74) *Attorney, Agent, or Firm* — Daly, Crowley, Mofford & Durkee, LLP

(57) ABSTRACT

An antenna system comprising a first antenna corresponding to a horn antenna, a second antenna corresponding to a horn antenna disposed such that the E-plane of the second antenna is co-planar with the E-plane of the first antenna an such that an aperture of the first antenna and an aperture of the second antenna are substantially in a common plane; and a third antenna corresponding to a horn antenna disposed such that the E-plane of the third antenna is substantially co-planar with the E-plane of the first antenna and such that an aperture of said third antenna is substantially in the same plane as the aperture of the first and second antennas and wherein the second and third antennas are canted toward each other.

15 Claims, 17 Drawing Sheets

(56) References Cited

OTHER PUBLICATIONS

International Preliminary Report on Patentability of the ISA for PCT/US2009/041903 dated Nov. 11, 2010.
PCT Search Report of the ISA for PCT/US2009/041903 dated Jul. 8, 2009.
PCT Written Opinion of the ISA for PCT/US2009/041903 dated Jul. 8, 2009.
Patent Examination Report dated Oct. 1, 2012 for PCT Application No. 2009/241388, 4 pages.
Response to Japanese Office Action for Japanese Pat. Appl. No. 2011-507571, filed on Oct. 29, 2010, 16 pages.

* cited by examiner

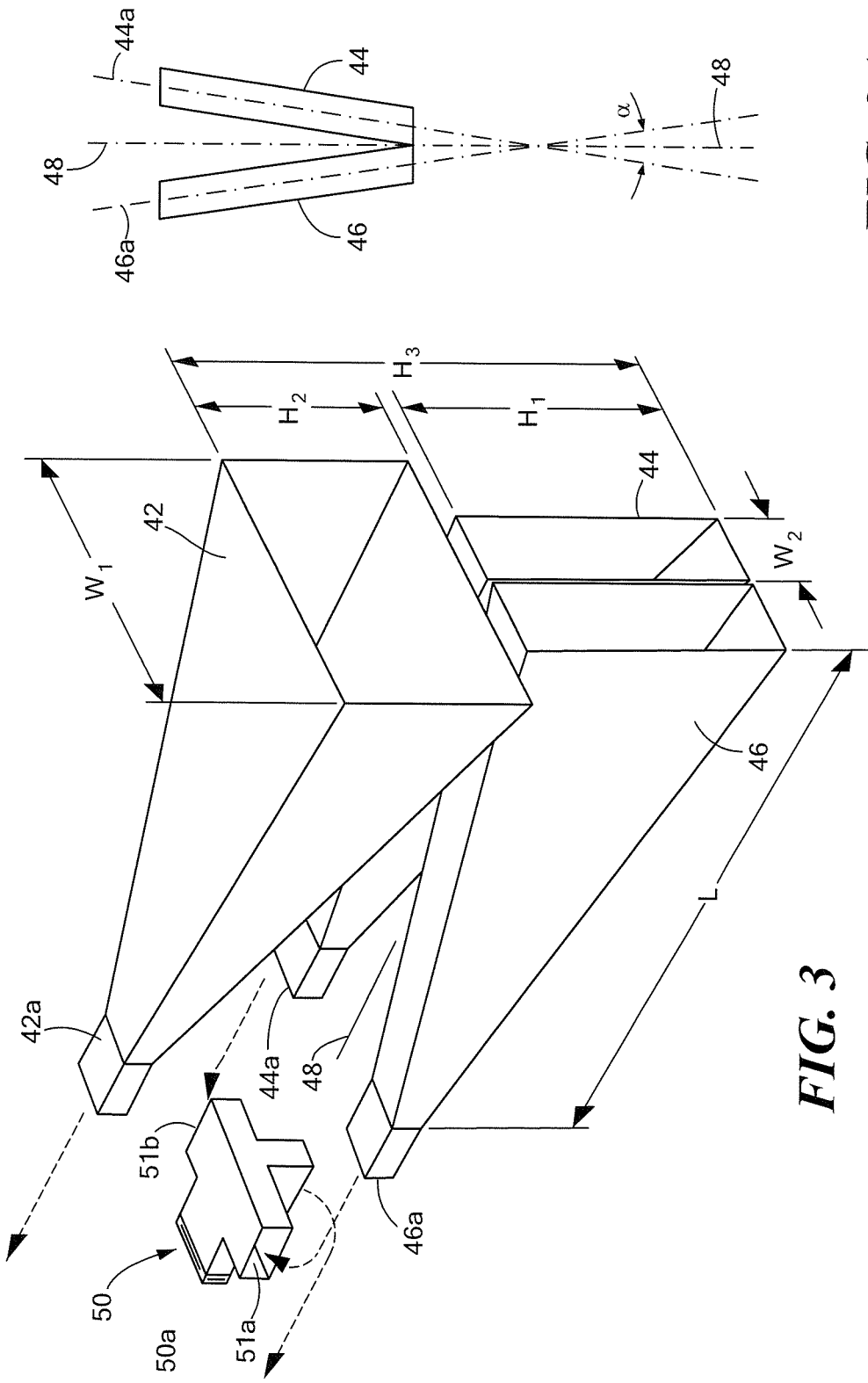

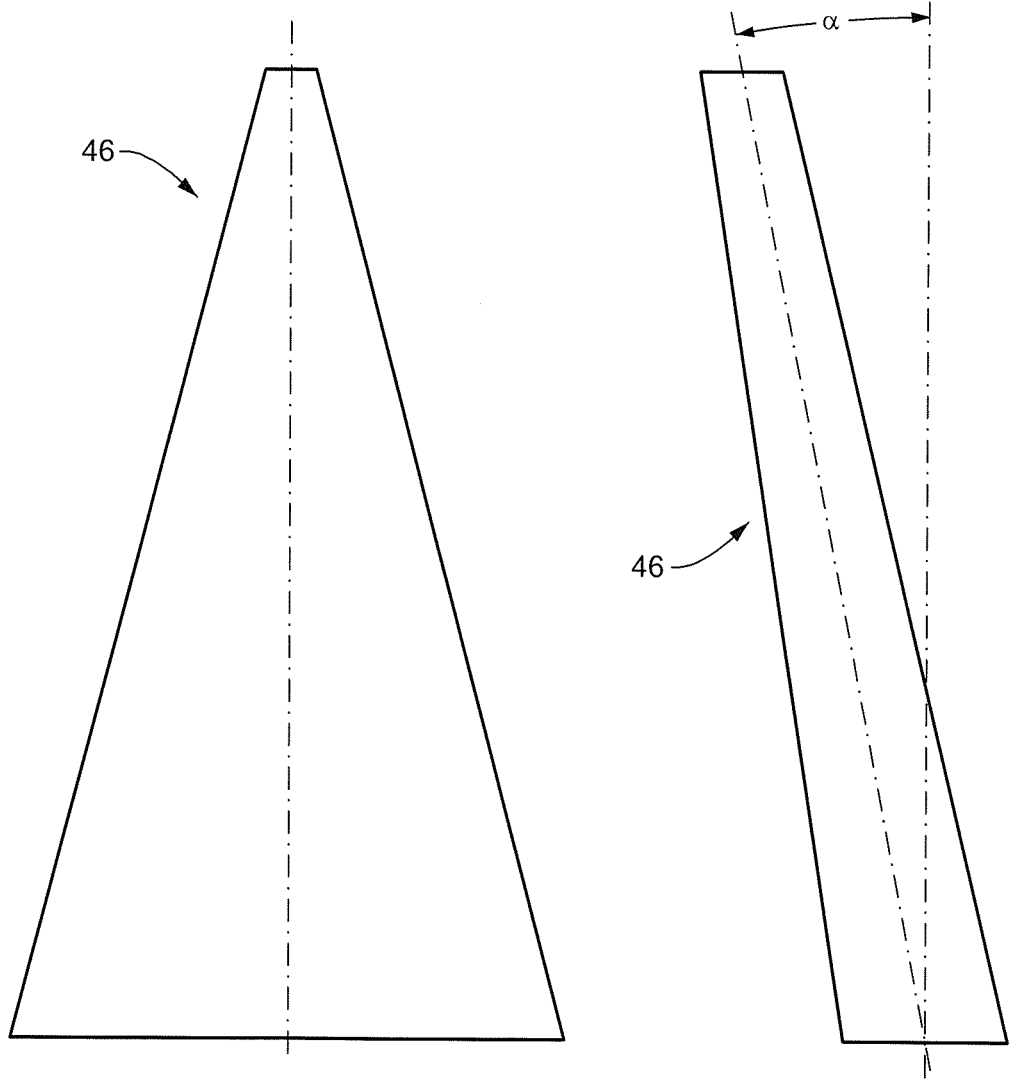
FIG. 5  FIG. 6

Table 1, Horn Antenna Parametrics (Parametrics Vs. Axial Horn Length)

| Frequency | Wavelength | Axial Length - Wavelengths | Height - Wavelengths | Width - Wavelengths | Half Power Beam Width - (Wavelengths) | Half Power Beam Width - (Wavelengths) | Axial Length (mm) | Height (mm) | Width (mm) | Physical Aperture (mm^2) | No Loss Gain Gain-Ideal (dBi) | Gain w/ aperture eff. Losses Gain-eff (dBi) | Θ e | Θ h | 3 dB E-Beam Width (deg) E-BW | 3 dB H-Beam Width (deg) H-BW |
|---|---|---|---|---|---|---|---|---|---|---|---|---|---|---|---|---|
| f (GHz) | λ (mm) | L(λ) | ae(λ) | ah(λ) | hpbwe | hpbwh | L (mm) | ae (mm) | ah (mm) | ap (mm^2) | | | | | | |
| 37.00 | 8.1081 | 10 | 4.51 | 5.84 | 11.34 | 12.98 | 81.08 | 36.55 | 47.33 | 1730.20 | 25.19 | 22.98 | 25.41 | 32.54 | 11.34 | 12.98 |
| 37.00 | 8.1081 | 20 | 6.00 | 8.13 | 8.68 | 10.09 | 162.16 | 48.68 | 65.96 | 3211.04 | 27.88 | 25.66 | 17.07 | 22.99 | 8.68 | 10.09 |
| 37.00 | 8.1081 | 30 | 7.10 | 9.88 | 7.42 | 8.70 | 243.24 | 57.57 | 80.08 | 4610.37 | 29.45 | 27.23 | 13.50 | 18.70 | 7.42 | 8.70 |
| 37.00 | 8.1081 | 40 | 8.00 | 11.34 | 6.65 | 7.84 | 324.32 | 64.84 | 91.91 | 5959.28 | 30.57 | 28.35 | 11.42 | 16.13 | 6.65 | 7.84 |
| 37.00 | 8.1081 | 50 | 8.77 | 12.61 | 6.10 | 7.23 | 405.41 | 71.10 | 102.27 | 7271.89 | 31.43 | 29.21 | 10.02 | 14.38 | 6.10 | 7.23 |

FIG. 7A $\theta_e = 86.69(L)^{-0.532}$

SMALL APERTURE INTERROGATOR ANTENNA SYSTEM EMPLOYING SUM DIFFERENCE AZIMUTH DISCRIMINATION TECHNIQUES

RELATED APPLICATIONS

This application claims the benefit of U.S. Provisional Application No. 61/048,760 filed Apr. 29, 2008 under the provisions of 35 U.S.C. §119(e) which application is hereby incorporated herein by reference in its entirety.

FIELD OF THE INVENTION

This invention relates to radio frequency (RF) antennas and more particularly to array antenna systems capable of operation in the milli-meter wave (mmW) frequency range.

BACKGROUND OF THE INVENTION

As is known in the art, combat identification (or CID), is the process of attaining an accurate characterization of targeted and detected objects in a battlespace. Depending upon the situation, such a characterization may be limited to identification of an object with an identifier such as "friend," "enemy," or "neutral." In other situations, other characterizations may be required, including, but not limited to, class, type, nationality, and mission configuration may be used along with appropriate identifiers.

As is also known, such identification processes are sometimes carried out via combat identification systems at millimeter wave (mmW) frequencies. Such combat identification systems typically use an interrogator antenna system which includes a directive antenna made up of an array of antenna elements. Such interrogator antenna systems are relatively large and heavy and thus are not generally appropriate for use on relatively light weaponry such as that which may be carried by a soldier. As a result, these combat identification systems are typically deployed on tanks and other large vehicular weapons platforms that can support this rather large and heavy equipment.

Attempts at extending combat identification technology to lighter weaponry (e.g. lighter than tanks and motorized vehicles) has centered upon reducing the size and weight of the large interrogator antenna arrays. One common approach to reducing the size and weight of the interrogator antenna has been to reduce the number of antenna elements which make up the directive antenna array. One problem with this approach is that by reducing the number of antenna elements in an array, the electrical aperture dimensions of the array antenna are correspondingly reduced in size. This, in turn, leads to larger azimuth discrimination angles which are not conducive to specific object targeting.

Size and weight restrictions on interrogator systems become even more of a concern in airborne applications. Furthermore, for airborne applications, additional implementation constraints such as mounting placement, aircraft weight and balance, and other related aerodynamic concerns need attention. Size, and weight must all be kept small so as not to create too much of an unwanted payload. In some applications, the airborne interrogator system must fit into an external aircraft pod of given dimensions with limited space provisions. It is also expected that operational range of airborne interrogator systems be commensurate with that achieved by ground based combat ID systems. One conventional antenna array used for ground applications is a multi-element continuous transverse stub array which has approximately a frontal area of 7 in by 4½ in or 31½ square inches (in$^2$). For the airborne applications, a frontal aperture which is significantly smaller than that used in ground applications may be used. Therefore, to extend combat identification to a multiplicity of applications, a reduction in the size and weight of existing state-of-the-art implementations is needed. For light weaponry and airborne applications, small aperture, directive, light weight, and small physical size combat ID systems are desirable.

SUMMARY OF THE INVENTION

In accordance with the concepts described herein, an interrogator antenna system includes pyramidal horn antenna and two sectored, canted horn antenna assemblies. With this particular arrangement, a relatively small and highly directive antenna array, appropriate for combat identification use, is provided. The pyramidal and sectored horn antennas are arranged in a sum-difference antenna architecture. The sum pattern is established with the optimal pyramidal horn antenna while the difference pattern is established with the two sectored and canted horn assemblies. The sum and difference patterns are thus achieved with only three horn antennas. This leads to an interrogator antenna system having a size and weight which is significantly reduced compared with conventional interrogator antenna systems. This size and weight reduced interrogator antenna also operates at millimeter wave (mmW) frequencies in the Ka frequency band around 37 GigaHertz (GHz). Moreover, required azimuth discrimination angles as well as usable range performance of this three-horn interrogator antenna system is maintained by using the optimal and sectored horn antennas in a sum-difference antenna architecture. This combination of horn antennas (aka horn radiators) placed in a specific form to achieve specific sum and difference azimuth radiation characteristics whereby the sum response is greater than the difference response only at the boresight angular region. Grating lobes that will cause the difference pattern to intrude into the sum pattern at various other azimuth angles are suppressed such that other than boresight, the difference pattern will always be greater than the sum pattern. In one embodiment, the pyramidal horn antenna may be provided as an optimal pyramidal horn antenna.

The use of horn antennas as opposed to linear antenna elements in an array configuration results in a number of grating lobes (unwanted and undesired) in the resulting antenna patterns which is reduced when compared with the number of grating lobes which would result from use of linear antenna element arrays. Canting the sectored horns used for the difference pattern generation further suppresses grating lobes that are formed in the difference pattern. Thus, the approach described herein negates the need for the interrogator antenna system to include an omni-directional guard antenna such as those employed in conventional mmW interrogator antennas.

The approach described hereinto resolves grating lobe incursions that are common with conventional linear element array interrogators. In addition to forming a sum and difference radiation pattern without incursions, the approach described hereinto resolves the desired bore sight response with two radiation patterns where conventional linear element array interrogators must use three (i.e. sum, difference, and omni) patterns. Since the three horn interrogator antenna system highly suppresses grating lobes, the need for the omni pattern becomes moot.

The three horn interrogator antenna system described herein is provided having a size and weight which is reduced compared with the size and weight of prior art interrogator antenna systems while at the same time having similar azimuth discrimination and range capability. Thus, the antenna array described herein provides crew-served, light-weight vehicles, and potentially dismounted soldiers with a means of friend-or-unknown identification.

Conventional array ID antenna systems have high directivity and gain; however, the needed beam forming circuitry required by these types of ID antenna systems causes them to become inefficient due to signal losses incurred by the time phased differences necessary for the several linear radiating elements of such arrays.

The three horn interrogator array described herein, however, has a smaller physical and electrical aperture than conventional arrays, but the efficiency of the smaller aperture makes this three horn interrogator array perform equally to the larger and heavier conventional ID antenna systems. Thus, the electrical performance characteristics of the three horn interrogator array described herein are substantially equal to the electrical performance characteristics of conventional ID antenna systems while at the same time having a smaller size and weight than conventional ID antenna systems.

Array physics dictates that antenna element spacing be held to certain dimensions in order to suppress so-called "grating lobes." These lobes appear in the antenna's radiation pattern. Since the three horn interrogator antenna is composed of only three antenna elements as opposed to a plurality of individual radiating elements, such grating lobes are significantly reduced.

Two sectored horn antennas are used to produce the difference pattern. By canting these horns inward toward each other, grating lobe occurrences in the resulting difference pattern are significantly suppressed and pragmatically eliminated. Thus, grating lobe suppression is a primary feature afforded by this three horn interrogator antenna system.

By canting the sector difference horns in toward each other, at any angle other than the boresight angle, the extended radiation from each sector horn will be unequal. Even if the phase difference from these two horns were to be 180 degrees (totally out of phase), there would be incomplete cancellation since the resulting rays would be unequal in amplitude. One ray would subtract from the other, but a residual amount of radiation is still present. Since complete cancellation cannot occur, a grating lobe cannot be created. In other words, canting the sectored horns simply prevents complete angular ray cancellation thus eliminating the creation of grating lobes. It is the ray cancellation (at a specific azimuth angle) that forms deep nulls and resultant grating lobes; this phenomenon is typical of linear array antenna systems.

Furthermore, ease of manufacture of horn type antennas, as compared to manufacturing techniques required for prior art interrogator array systems, provides cost savings making combat identification available to more users. Economies of scale afforded by the ease of manufacture of the three horn interrogator antenna system allows crew served and dismounted forces to be equipped with combat identification means. The cost of providing these users with combat identification is significantly less than the equipment (large arrays) used currently which can only be applied to large vehicular platforms (e.g. tanks).

The battlefield target identification device (BTID) concept includes providing a narrow beam interrogation that can be "pointed" at a potential target in order to "ask" for friend identification. If a target is equipped with BTID, it responds with a reply signal (e.g. using an omni-directional antenna). Ideally, the beamwidth of the interrogator is sufficiently small so as to avoid objects not being specifically targeted, but that are in close proximity, azimuth-wise, to the desired target. Should such non-targeted objects be friendly, a response from them should not occur. A narrow directed beam is achieved by using a directional antenna system which makes use of both sum and difference patterns from a set of antenna elements that are arranged in a prescribed array geometry. Beamwidths of the narrow beam are only a few degrees and it is established by radiating a sum pattern and a difference pattern in a time diverse manner. In one exemplary embodiment, a system is provided having a beamwidth in the range of 1-5 degrees with a beamwidth in the range of 1-3 degrees being preferred. Other beamwidths, may of course also be used. In general, the beamwidth is selected in accordance with a variety of factors including but not limited to the particular application in which the system is being used. In general, it is desirable to have as narrow a beam as possible provided that the beam does not become so narrow that it becomes difficult to point it at the target.

Interrogator azimuth discrimination must therefore be sufficiently narrow to keep unintended transponders from responding. In addition, the azimuth discrimination beamwidth cannot be so small as to not fully illuminate (i.e. "cover") the desired transponder (vehicle) being targeted. To facilitate this goal, interrogator side-lobe suppression (ISLS) between the transponder replies received outside of the interrogator's field of view (FOV) may be used. When the antenna array is configured to radiate a sum pattern, basic directivity is established by the radiated sum pattern. When the antenna array is configured to radiate a difference pattern, a radiation null is observed to exist in the array's bore-sight aiming direction. In this manner, the difference pattern provides the ISLS beam sharpening. To provide ISLS for azimuth displacements off of bore-sight, the use of a constant envelope pattern of an omni-directional antenna is employed.

BRIEF DESCRIPTION OF THE DRAWINGS

The foregoing features of this invention, as well as the invention itself, may be more fully understood from the following description of the drawings in which:

FIGS. 3 and 4 are isometric views of a prototype of a three horn antenna array;

FIG. 3A is a top view of the sector horn antenna shown in FIG. 3;

FIG. 5 is a side view of a sector horn antenna element (E field is positioned vertically, i.e. down the page);

FIG. 6 is a top view of the same sector horn antenna element (E field is also positioned vertically down the page);

FIG. 7A is a table showing gain of optimal horn antennas as a function of their axial length;

DETAILED DESCRIPTION OF THE PREFERRED EMBODIMENTS

Figure 1:
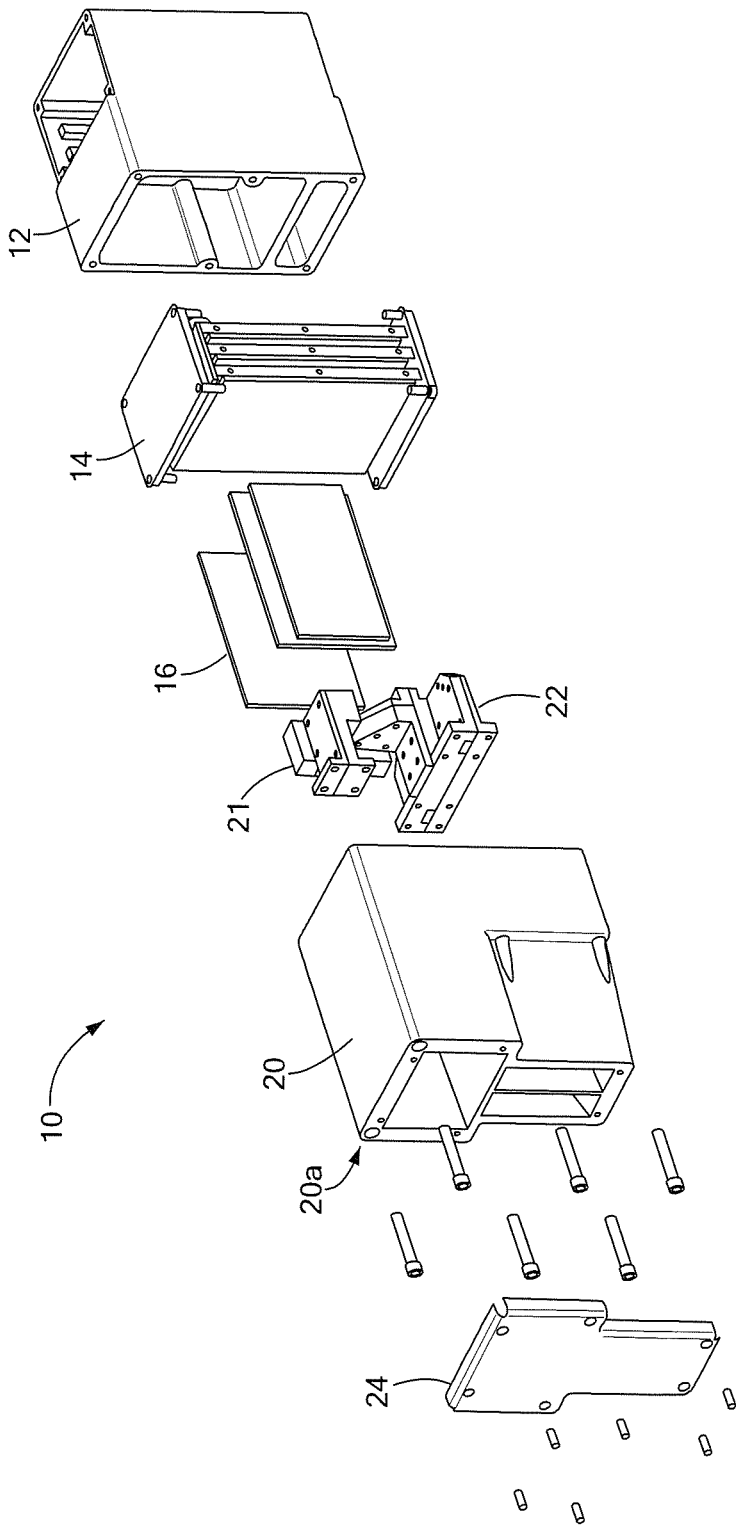
FIG. 1 is an exploded isometric view of an interrogator system.

Referring now to FIG. 1, a light weight vehicle Crew Served Combat ID (CSCID) 10 includes a chassis 12 having a miniaturized control interface electronics module (MCM) 14 coupled thereto. The MCM 14 directs a transceiver, 16, an antenna matching network 21, 22, a horn antenna assembly 20, and a polarizer/cover 24 to transmit either a sum pattern by directing the transceiver output to a sum port of the matching network 21, 22 or a difference pattern, by directing the transceiver output to a difference port of the matching network 21,22. In one particular embodiment, the output of transceiver 16 is coupled to the matching network sum port via a direct connection between the transceiver and the sum horn. The sum and difference patterns are sequenced with a specific time duration for each which is controlled by the MCM 14.

Transceiver 16 is coupled to the MCM 14 and horn antenna assembly 20 is coupled to transmit signals to/from MCM 14 and antenna matching networks 21, 22 are coupled to the horn antenna assembly 20. In the exemplary embodiment shown in FIG. 1, the antenna matching networks 21, 22 are coupled to provide RF energy to the horn antenna assembly 20.

Figure 2:
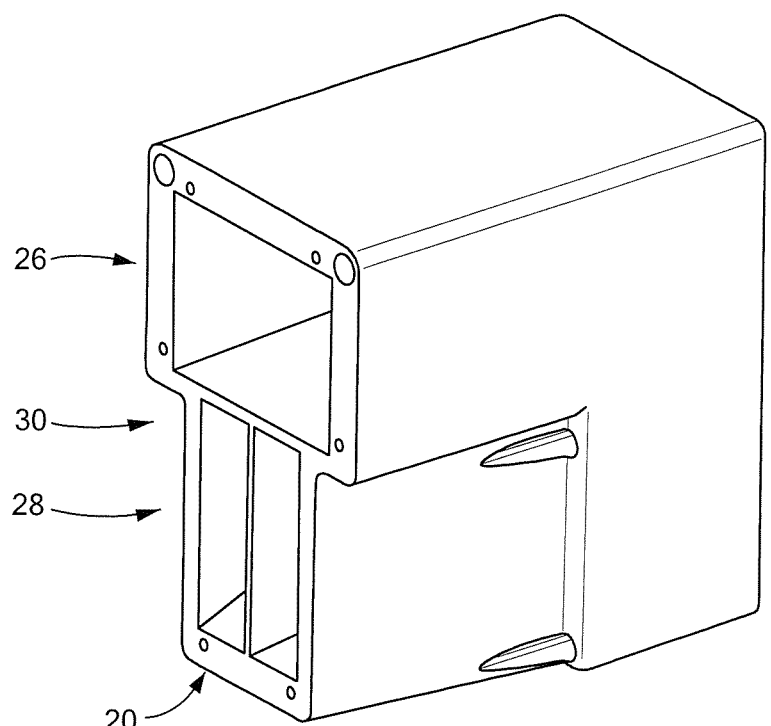
FIGS. 2-2B are isometric views of an array antenna.

Front cover and polarizer 24 is disposed over a radiating aperture 20a of horn antenna assembly 20. As will become apparent form the description provided herein below in conjunction with FIG. 2, it should be appreciated that aperture 20a comprises three separate apertures 26a (FIG. 2), 28a (FIG. 2), 30a (FIG. 2).

As will be described in detail further below, horn antenna assembly 20 comprises three horn antenna structures. Typically, when two horn antennas are placed side-by-side and fed 180° out of phase, a difference pattern results and a fairly deep null is observed at a bore-sight position (both in the azimuth and elevation planes). For pyramidal horns, their shortest aperture dimension is several wavelengths long. When placing such antennas close together so as to establish a difference pattern, in addition to a deep null at bore-sight, other deep nulls will occur at regularly spaced angular intervals. This phenomenon is known as grating. For some applications (including the above described interrogation antenna application), such "grating lobes" are unwelcome. Similarly, two horn antenna structures closely spaced and fed in phase will also exhibit "grating lobes"; however, their depth will not be as pronounced as compared to the difference pattern. To minimize the generation of grating lobes for the sum pattern, a single horn may be used.

In one embodiment, for the major field of view (FOV) from the bore-sight position to the sides of the horn structure, only a little grating is observed in the ±90° regions of bore-sight.

With respect to the difference pattern, "grating lobes" can be substantially reduced (or in some cases, even minimized) through the use of sectored horns rather than pyramidal horns. Thus, in a preferred embodiment, the difference pattern is accomplished through the use of two similar side-by-side sectored horn antennas. These horns are also canted toward each other so as to create unequal radiation amplitudes at any specific azimuth angle other than the 0 degree bore sight angle.

Figure 2A:
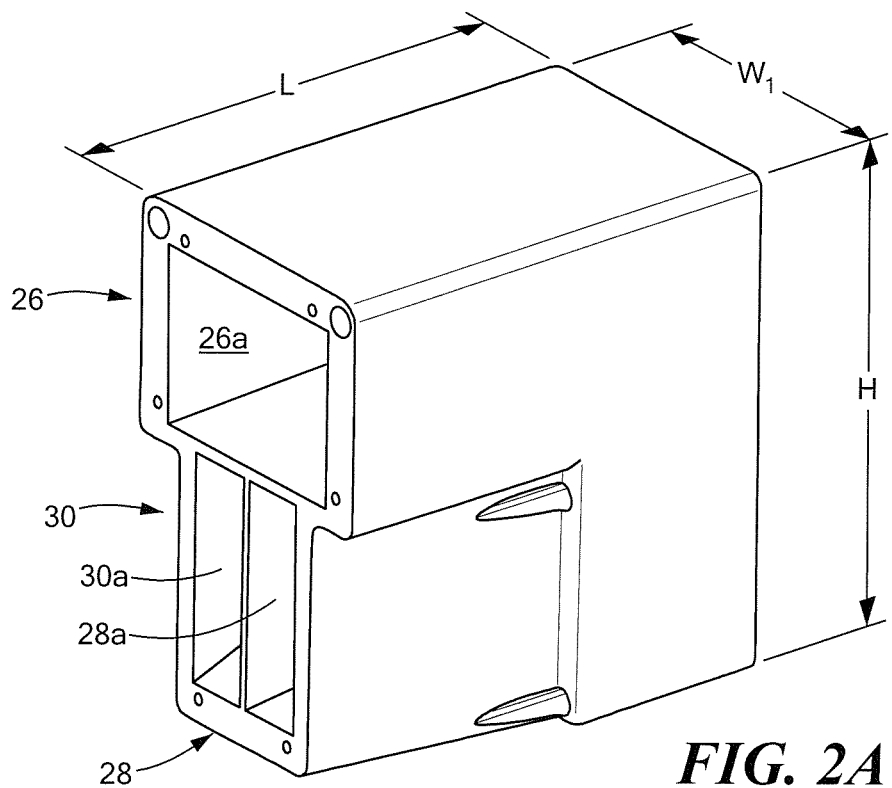
FIG. 2C is an isometric views of a prior art array antenna.
Figure 2B:
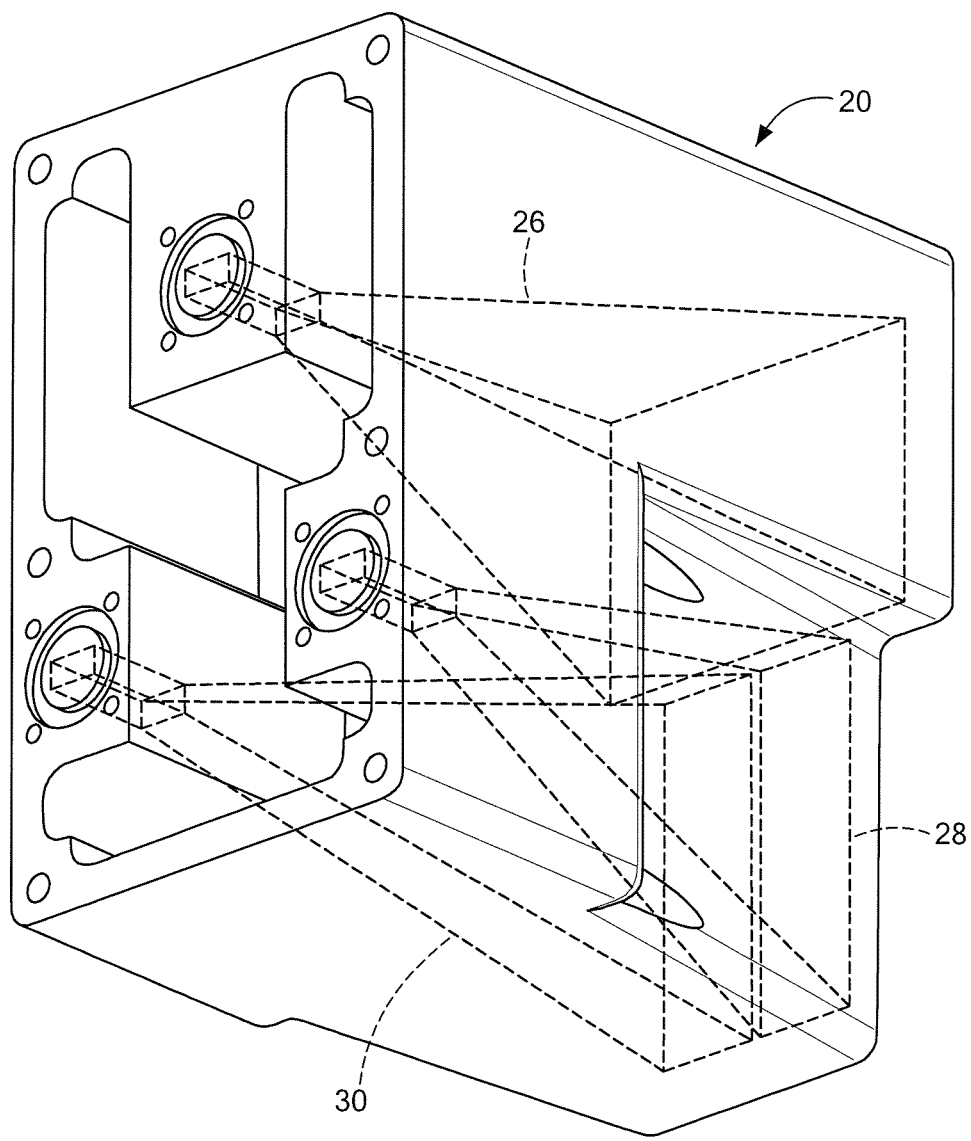

Referring now to FIGS. 2-2B in which like elements are provided having like reference designations, the horn antenna assembly 20 (also shown in FIG. 1) includes an optimal pyramidal horn 26 having an aperture 26a and a pair of canted sector horns 28, 30 having an apertures 28a, 30a, respectively. In this exemplary embodiment, the horn antenna assembly 20 is provided from plastic (e.g. via an injection molding technique or other techniques) which is plated to provide conductive surfaces. The horn antenna, may of course, be fabricated using any fabrication techniques known to those of ordinary skill in the art.

In one embodiment, for operation at about 37 GHz, the horn assembly 20 has a length L of 3.8 inches, a width W of 2.5 inches and a height H of 4.0 inches and thus has a volume of 38 cubic inches (cu in).

Figure 2C:
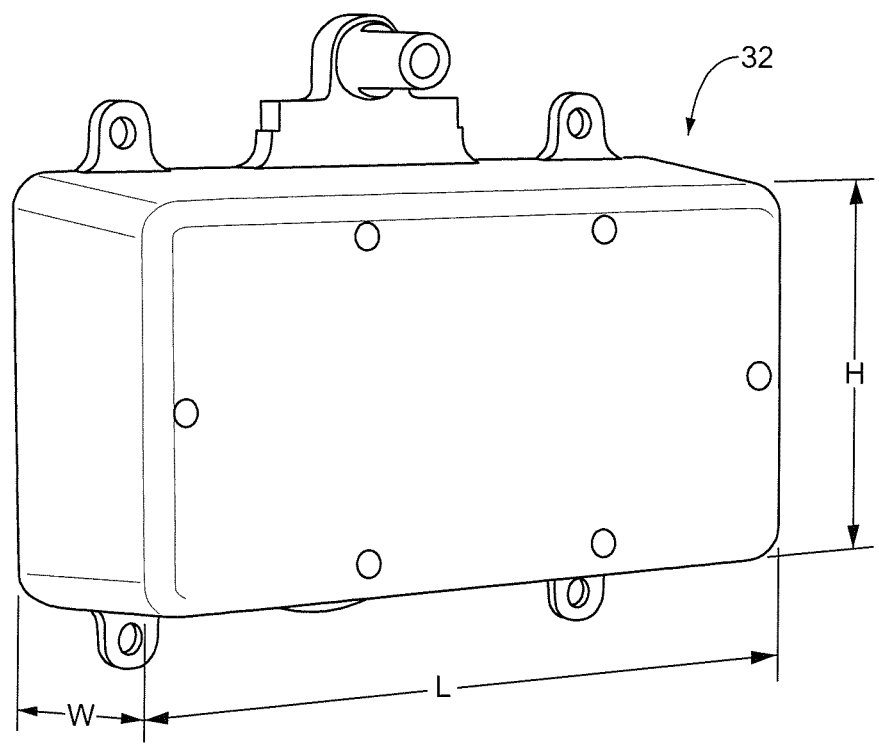

Referring now to FIG. 2C, a prior art interrogator antenna 32 for operation at about 37 GHz and fabricated from a conductive metal has a volume of 233.8 cubic inches (cu in). Thus, as can be seen by comparing the interrogator antenna 20 (FIG. 2A) and the interrogator antenna 32 (FIG. 2B), the interrogator antenna 20 takes up less volume. Also, by manufacturing the antenna 20 from plastic and then plating or otherwise causing the plastic to have a characteristic which reflects electromagnetic waves, the antenna 20 is lighter than antenna 32.

Referring now to FIGS. 3 and 3A, a horn antenna assembly 40 includes a sum horn 42 disposed above a pair of canted sector horns 44, 46. As illustrated in FIG. 3A, each of the horns 44, 46 has a central longitudinal axis 44a, 46a. The horns 44, 46 are disposed such that the central longitudinal axis 44a, 46a of each horn 44, 46 cross at an angle α which is typically in the range of about ten degrees. Ideally, the horns 44, 46 are arranged such that the central longitudinal axis of each horn 44, 46 is at an angle typically in the range of about five degrees with respect to a centerline 48 which runs between the two horns 44, 46. The angle, α, is selected to minimize grating lobes such that incursions between the sum and difference patterns no longer occur and are protected by an additional 3 dB of margin. The angle, α, should be the minimum necessary in order to preserve the maximal gain of the canted sectored difference horn antennas.

For airborne pod use, a small frontal aperture size is achieved with a highly directional single element sum antenna and the two sectored and canted difference horns. Horn antennas exhibit promise for airborne combat ID applications since either linear or circular polarized radiation patterns can be implemented. Depending upon terrain, use of one polarization as opposed to another (linear or circular) can be chosen to minimize effects ground reflections and unwanted multi-path scattering of the interrogating signal.

In one embodiment, antenna 42 is provided as an optimal gain pyramidal horn. While other horn configurations can be used, an optimal gain configuration assures maximum gain for a minimum size implementation. This antenna provides a sum pattern. The two oppositely phase fed vertical sectored horns 44, 46 provide good difference beam pattern performance. The size of the sector horns is chosen to be commensurate with that of the sum horn. For a combat ID Ka-frequency band at 37 GHz, the frontal area of such an arrangement works out to be less than 5¾ square inches. Such an arrangement provides ample sum pattern gain in the bore-sight region. Beyond the sum-difference crossover region of a few degrees, on up to about ±30 degree from bore sight, difference pattern gain is predominant. From ±30 degrees of bore-sight to ±180 degrees, the difference pattern remains dominant; however, to prevent ambiguity in the detection of sum and difference signal levels at these azimuth angles, the use of an omni-directional guard antenna can further assist in providing low probability of replies. In some embodiments, by virtue of eliminating grating phenomena, it is not necessary to employ the omni-directional guard antenna technique.

A port 42a of horn 42 is coupled to a so-called sum (Σ) port of a transceiver (not shown). Ports 44a, 46a of difference horns 44, 46 are coupled to respective ones of difference (Δ) ports of the transceiver (not shown) through a hybrid junction 50.

A first hybrid junction port 50a corresponds to the difference port of the transceiver, a second hybrid junction port 51a is coupled to an input port of the antenna 46 and a third hybrid junction port 51b is coupled to an input port of the antenna 44. A fourth hybrid junction port is terminated. Hybrid junction 50 provides a 180 degree phase shift between the two canted sector horns, 44 and 46.

The hybrid junction 50 operates such that a signal fed to the hybrid junction difference port is coupled to each of the second and third hybrid junction ports 51a, 51b with substantially equal magnitude but substantially 180 degrees out of phase.

In one particular embodiment, the hybrid junction 50 is provided as a waveguide magic-T. In particular, the antenna ports 44a, 46a are coupled to the E-plane ninety (90) degree arms 51a, 51b of the magic-T. The 180 degree port 50a is coupled to the difference (Δ) port of the transceiver while the magic-T sum port 50b is terminated (preferably in a matched impedance).

Those of ordinary skill in the art will appreciate, of course, that forms of hybrid junctions other than magic-Ts exist and may be used to perform the necessary electrical functions performed by hybrid junction 50.

Figure 4:
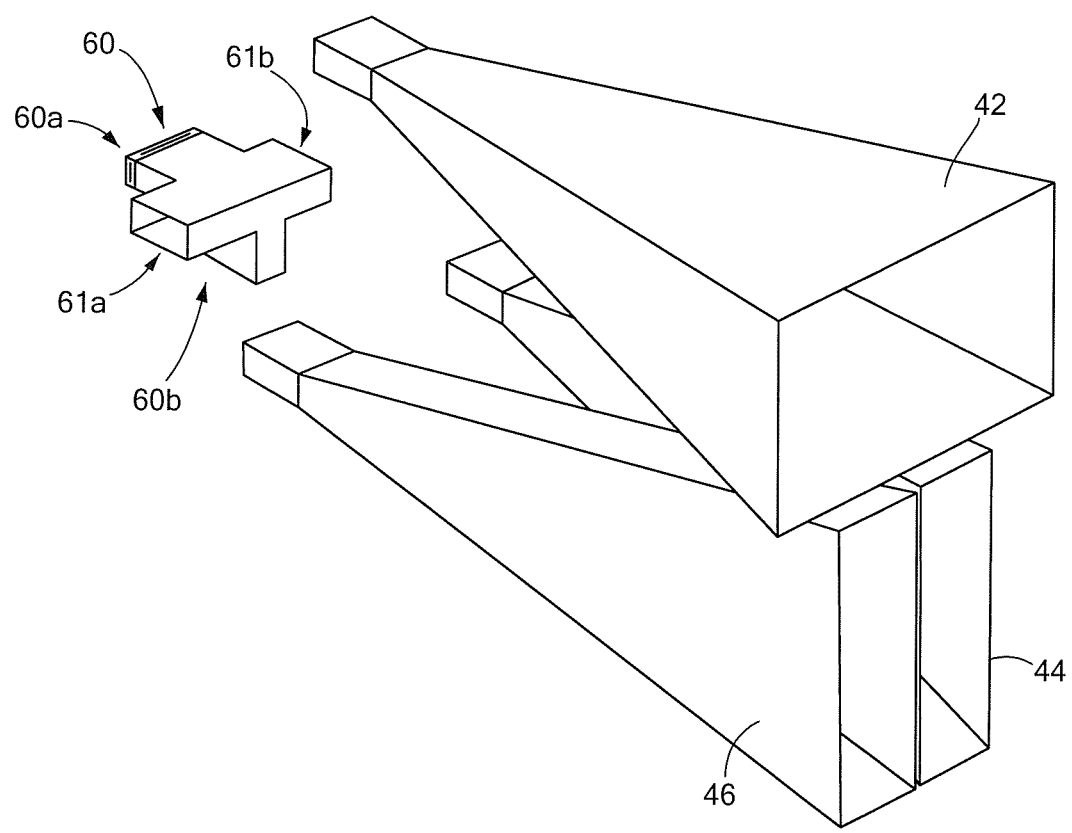

Referring now to FIG. 4 in which like elements of FIG. 3 are provided having like reference designations, sum horn 42 is directly connected to the sum (Σ) port of a transceiver (not shown in FIG. 4). A sum port 60a of a magic-T 60 is terminated in a matched impedance 63. The canted sector horns 44, 46 are coupled to respective ones of E-plane arms 61a, 61b of magic-T 60. In response to a signal provided to the magic-T difference port 60b, the magic-T provides two 180 degree shifted signals at ports 61a and 61b.

The optimal pyramidal horn antenna used for the generation of the sum-pattern is provided as a so-called "10λ horn." The axial length of the horn (i.e. the length along a central longitudinal axis of the horn) is ten (10) wavelengths long and at 37 GHz this is equal to 81.1 millimeters (mm). The physical aperture as shown provides an optimal far field gain. The flare of the horn is therefore known as optimal. While other lengths may be used, the geometry of the horn configuration must be maintained to keep phase distortion encountered at the aperture of the horn at a minimum. (The wave front at the aperture of the horn is physically spherical. A theoretical planar waveform is what is ideally being sought). For a specific tolerable phase distortion (spherical to planar differential), there does exist an optimal gain. Any divergence from the optimal geometry will impact this phase distortion and also gain.

The sectored horns are arranged such that their combined width is the minimal dimension. The number of wavelengths across the width of the two horns should be kept low. This too, suppresses grating. These sectored horn antennas are also 10λ in length and are optimized for far-field gain. This antenna arrangement provides a sum-pattern gain of 24 dBi and a maximum delta-pattern maximum lobe gain of 19.0 dBi. For the first 30 degrees of azimuth displacement off of bore-sight, there exists only one set of sum-delta crossovers. For the bore-sight region, the sum-pattern is dominant and beyond the crossover point up to ±30 degrees of bore-sight, the delta-pattern is dominant. The antenna structure patterns are presented in the detailed sections of this paper.

With such an antenna structure, coupled with the transceiver module used for the ground Combat ID (CID) application, interrogation slant ranges of up to 6 KM are achievable with positive link margin.

A study was conducted of linear arrays, reflective antennas, corner and parabolic reflector systems, as well as horn antennas. Considering size versus directivity and gain for the frequencies of interest (36.7 to 37 GHz), the horn antenna offers the best performance trade-off of those antennas considered. While linear arrays and reflective type antennas yield greater gain performance, this performance results in somewhat large structures compared to that of horn antennas. At gains in the 15 to 25 dBi range, the horn antenna has a size advantage over the other candidates. For gains above this figure, horn antenna volume grows cubically ($3^{rd}$ order exponential) and compared to parabolic reflectors, becomes the larger structure.

The horn antenna dimensions considered are commonly known as "optimal." To achieve maximal gain, a certain horn flare angle for a specific physical aperture must be maintained. For antenna system design considerations, an electromagnetic field modeling tools such as FEKO™, HFSS™ and CST Microwave Suite™ were used. Such modeling tools can be used to determine and characterize antenna system performance of the antenna systems described herein.

Figure 7:
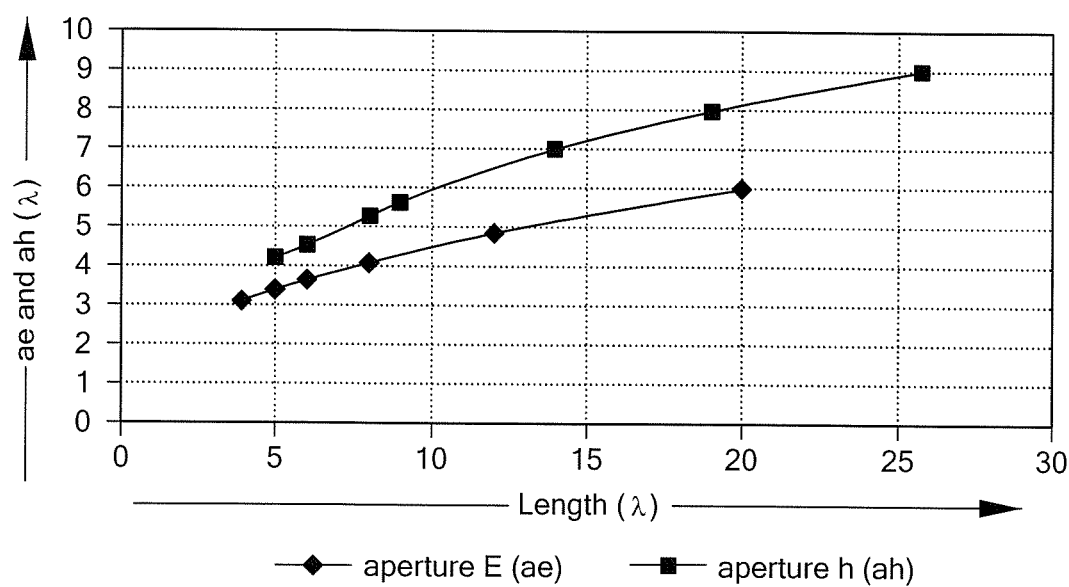
FIG. 7 is a plot of Apertures vs. Axial Horn Length.
Figure 8:
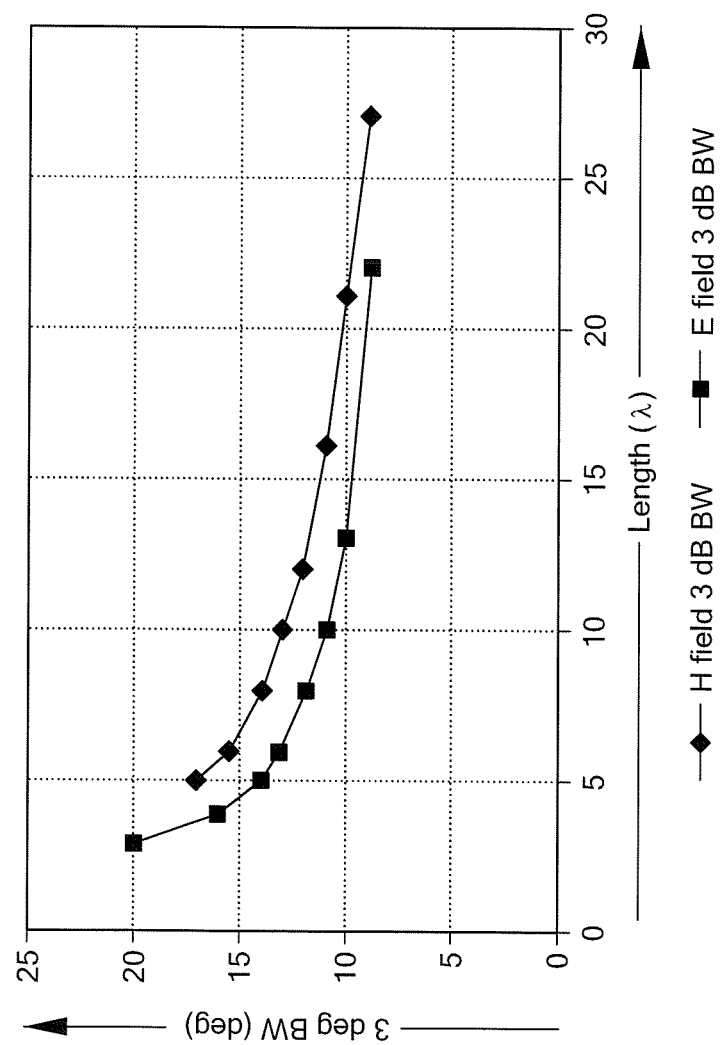
FIG. 8 is a plot of Beamwidth vs. Axial Horn Length.
Figure 9:
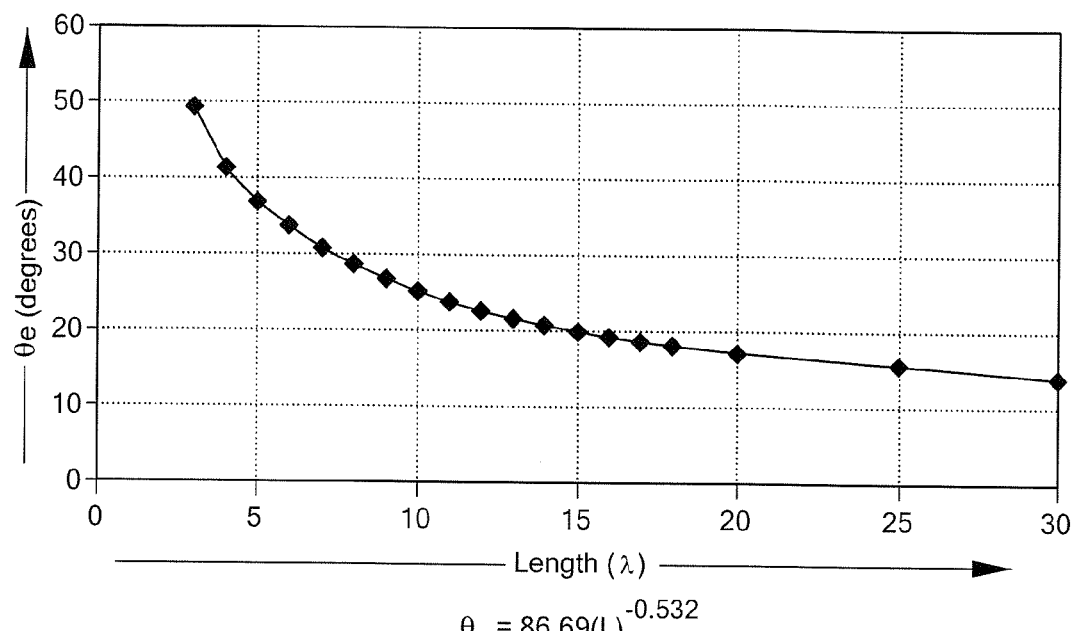
FIG. 9 is a plot of E-field Planar Flare Angle vs. Axial Horn Length.
Figure 10:
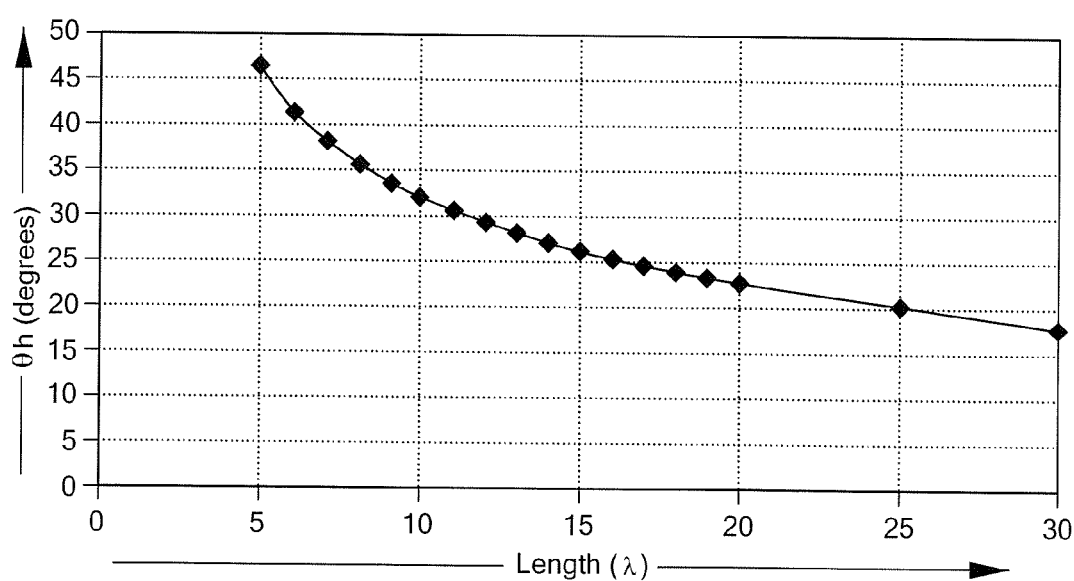
FIG. 10 is a plot of H-field Planar Flare Angle vs. Axial Horn Length.

While some of these modeling tools provide both near and far field radiation pattern information as well as predicted VSWR characterizations, they do not readily provide optimizations. Thus, optimal horn performance, i.e. smallest achievable structure for a given directivity and gain, can be determined separately. For example, directivity and gain can be accomplished using techniques presented in the *Antenna Engineering Handbook*, compiled by Henry Jasik and in the text, *Antennas*, by John D. Kraus. For the pyramidal horn antenna, using the mathematical relationships and derivations given in these references, an Excel™₃ spreadsheet was constructed do develop design curves. From this constructed information, optimally sized antenna structures can be determined, examined, and compared. Such design curves are presented below in conjunction with FIGS. 7 and 8. Optimum aperture, beamwidth, E-field, and H-field flare angles are presented as a function of the antenna horn length. All dimensions are expressed in terms of wavelength, λ.

Referring now to FIGS. 5 and 6, the dimensioning of a horn antenna is shown. FIG. 5 is a side view of a horn antenna element (E field is positioned vertically, i.e. direction down the page) and FIG. 6 is a top view of the horn antenna element (E field is also positioned vertically down the page).

FIGS. 7-10 show the optimal dimensions for horn antenna structures. Shown along with the charts are the corresponding characteristic curve expressions. Note, all parametrics are a function of the axial length of the horn antenna and all dimensions are expressed in terms of wavelength, λ.

The gain of these antennas is directly proportional to their physical aperture and is:

$$G_a = (4\pi a_e a_h)/\lambda^2.$$

In which:
 $G_a$ is the theoretical ideal gain of the antenna;
 $a_e$ is the linear e plane aperture (length);
 $a_h$ is the linear h plane aperture (length); and
 λ is the wavelength.

It should be noted that the values for $a_e$, $a_h$, and λ are all expressed in the same units. The electrical aperture efficiency of horn antennas is on the order of 60% and therefore, the pragmatic or realizable gain of a horn antenna is typically on the order of 60% of $G_a$.

FIG. 7A, shows the gain of optimal horn antennas as a function of their axial length.

It should be noted that for an antenna having an axial length L equal to $10\lambda$ or (i.e. the 81.1 mm—first row in the table shown in FIG. 7A) the ideal and pragmatic gains are 25.19 and 22.98 dBi respectively. If the horn length is increased to $20\lambda$, or 162.2 mm the gain only increases 2 to 2.5 dB. The size to gain trade increases rapidly and for this reason the $10\lambda$ horn was chosen for the airborne interrogator application. In some applications, given size constraints may result in a decision being made that the premium in antenna size for just a few more dB of gain is unwarranted. However, this is a trade-off and the decision may vary from application to application depending upon the factors of each particular application. What is also noteworthy, is that horn antennas can be scaled to provide, within physical limits, specific gains and directivities for varied applications.

Optimal sectored horns are designed in a similar manner as the pyramidal horn where either $a_h$ or $a_e$ is held at the same dimension as the feed waveguide width. The optimal sectored flare is the same as the corresponding and respective $a_e$ or $a_h$ of a pyramidal horn. The width of the WR-28 waveguide feed is maintained as the sectored horn width. Two such horns are fed one-hundred eighty (180) degrees out of phase to product the difference pattern.

Figure 11:
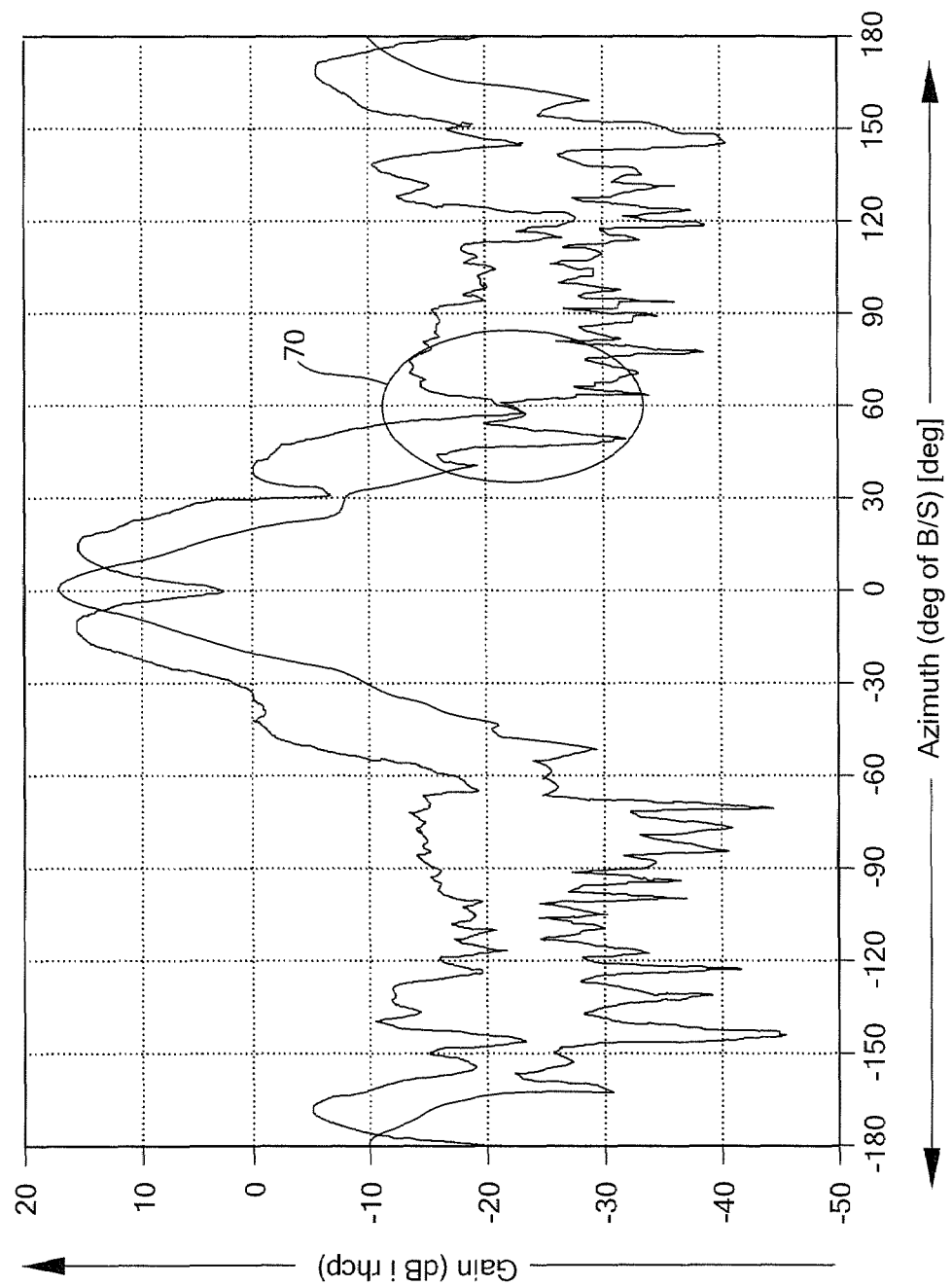
FIGS. 11-11C are a series of plots of azimuth sum and difference patterns from a 10λ optimal pyramidal and sectored horn antenna structure.
Figure 11A:
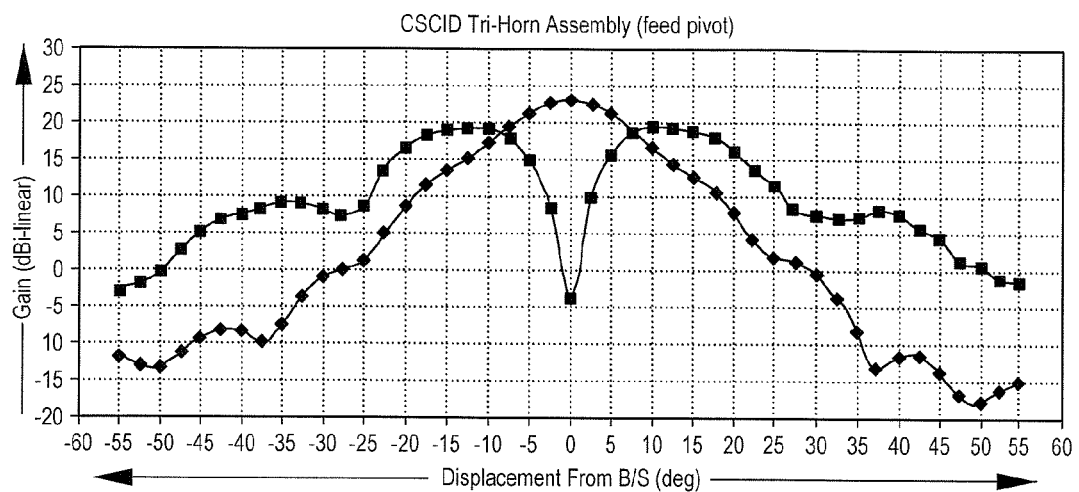
Figure 11B:
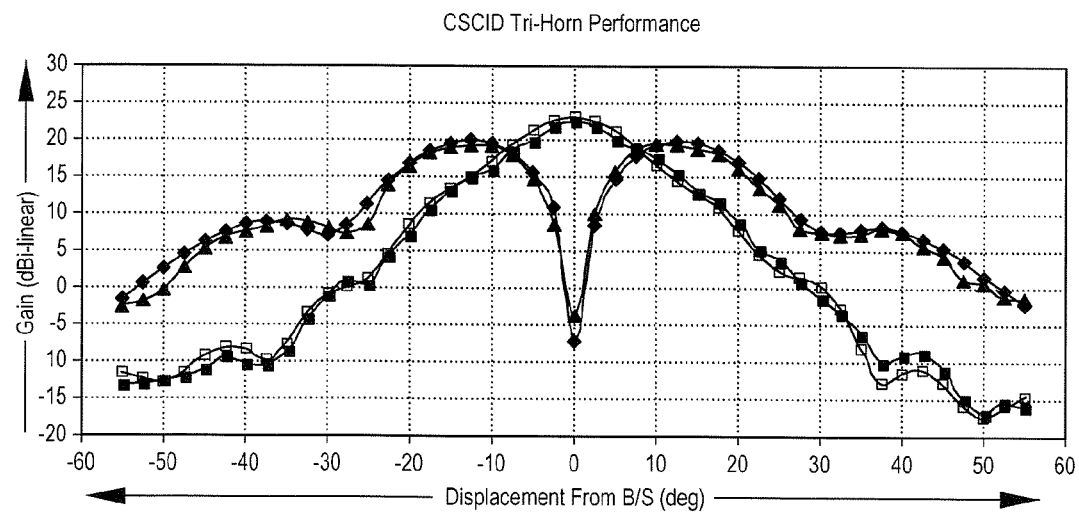
Figure 11C:
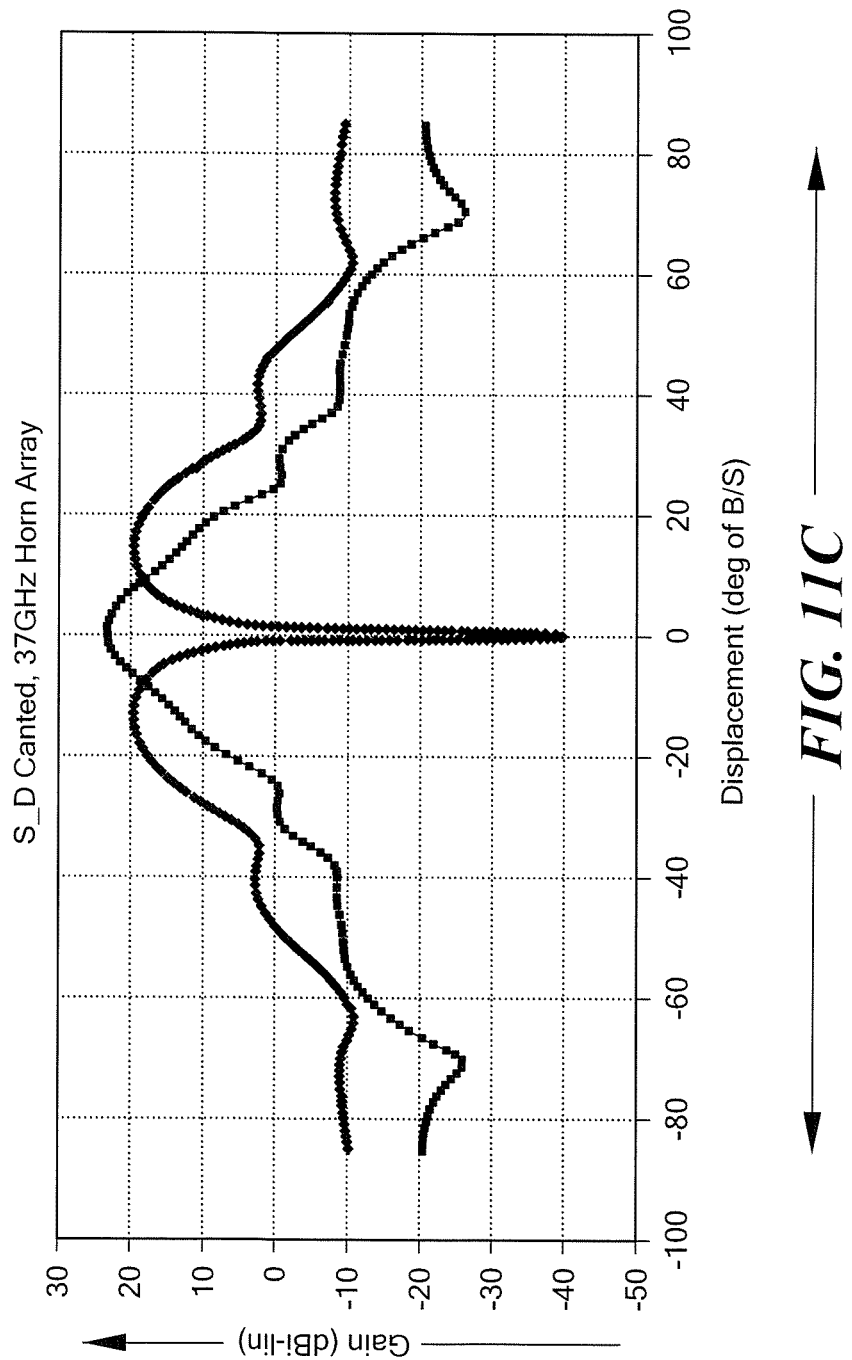

Referring now to FIGS. 11-11C, sum and difference azimuth antenna patterns produced by an antenna having a structure the same as or similar to the antenna structures shown in FIGS. 2-4 are shown. The azimuth sum and difference patterns shown in FIG. 11 are from a $10\lambda$ optimal pyramidal and sectored horn antenna structure. Region 70 denotes an incursion of the delta pattern into the sigma pattern. Ideally, the delta pattern should be less than the sigma pattern only at boresight. FIGS. 11A-11C illustrate a delta pattern which is less than the sigma pattern only within the region which is approximately boresight +/−7.5 degrees. Outside of this angular range, the delta pattern is greater than the sigma pattern.

In order to obtain these far field patterns, a FEKO™ modeling tool applies a meshing algorithm for all conductive surfaces. The finer the mesh, the more data points per azimuth sweep are produced. The license granted by the tool vendor provided for only a 1 GB file size and this put restrictions on the granularity of the mesh. For this reason, the depth of the null at bore sight is limited by the number of data points that could be applied. It is shown to be about a 10 dB null where in reality it is expected to be more on the order of 22 to 25 dB. The non-symmetrical pattern representations are a result of the feed mechanism used for applying RF energy to the horn antennas. A quarter wave stub, placed a quarter-wave from the back-short of a WR-28 waveguide served as the RF launch. The waveguide feed was chosen to be $2\lambda$ long before the flare of the horn starts. This method of RF injection produced approximately a VSWR of 1.45:1. Optimization of the feed method is believed to be best accomplished by trial and error. The non-symmetry of the feed produces the non-symmetry of the patterns.

The patterns shown above are very favorable for the airborne application. For the first ±60 degrees of bore-sight, the delta-pattern remains predominant outside of the cross-over area where the sum-pattern is the greater. It is at +60 degrees and +120 degrees where the delta-pattern falls to, or comes very close to the same level as the sum-pattern. If the non-symmetry issue can be resolved by a more optimum feed method, then it is probable that these areas of near equal pattern responses can resolved. If not, then use of an omni guard antenna can be used as portrayed in FIG. 13.

Figure 12:
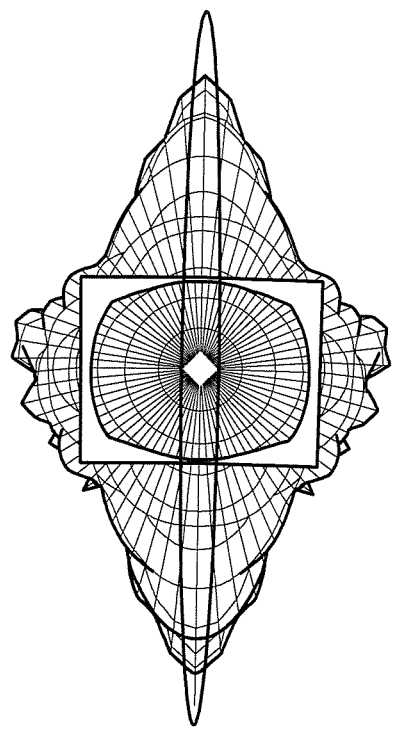
FIGS. 12, 12A are three dimensional far field radiation patterns of the antenna.
Figure 12A:
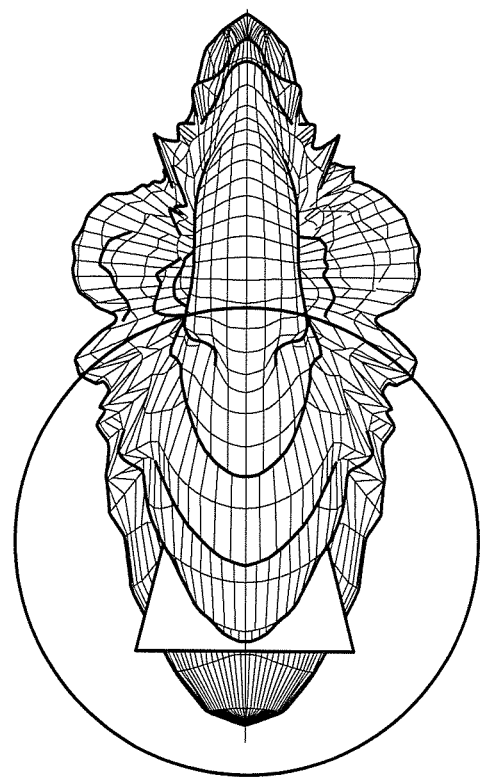

Referring now to FIGS. 12 and 12A, three dimensional far fields of the antenna sum pattern are shown.

Figure 13:
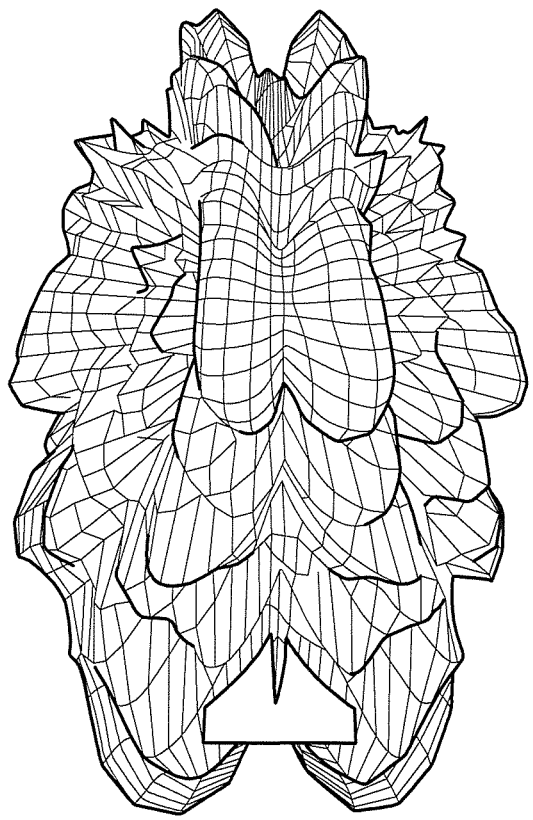
FIGS. 13, 13A are three dimensional far field radiation patterns of the antenna.
Figure 13A:
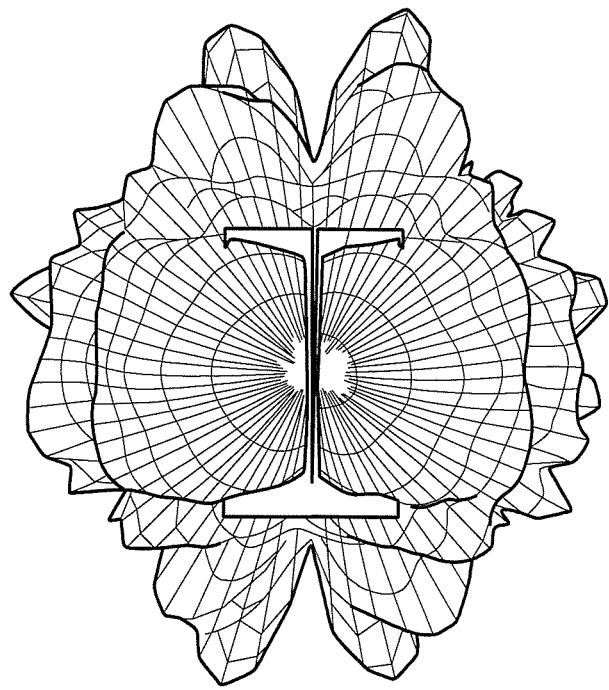

Referring now to FIGS. 13 and 13A, three dimensional far fields for the antenna difference pattern are shown.

Figure 14:
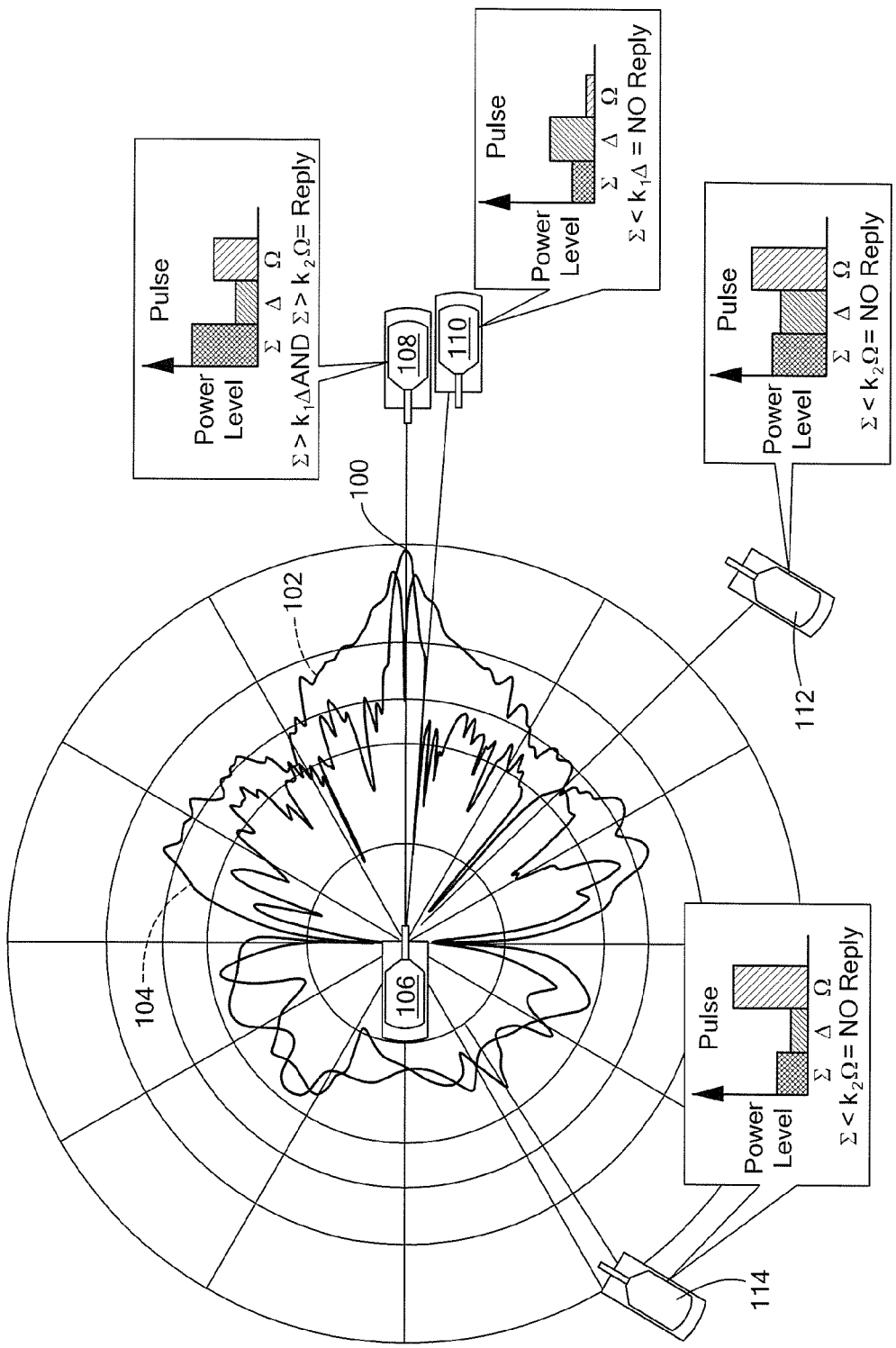
FIG. 14 is an antenna radiation pattern plot which illustrates how sum, difference and omni-directional antenna patterns are time domain multiplexed to establish a criteria for a reply.

Referring now to FIG. 14, a sum pattern 100, a difference pattern 102 and an omni pattern 104 are time domain multiplexed to establish the criteria for a reply. This data sequence is transmitted as an interrogation by an interrogator disposed on a vehicle 106. Upon reception by a transponder, received signal power measurements are made and depending on the relative signal strengths of the $\Sigma$, $\Delta$, and $\Omega$ signals, the transponder either responds to the interrogator (because it determined it was indeed being targeted. Transponders can be mounted on any or all of vehicles 108-114. In this case only the transponder on vehicle 108 responds to the interrogator and the responders on vehicles 110-114 do not reply.

As mentioned above, the battlefield target identification device (BTID) provides a narrow beam interrogation that can be "pointed" at a potential target in order to "ask" for friend identification. If the target is equipped with BTID, it responds with a reply signal (e.g. using an omni-directional antenna). Ideally, the beamwidth of the interrogator needs to be sufficiently small so as to avoid objects not being specifically targeted, but that are in close proximity, azimuth-wise, to the desired target. Should such non-targeted objects be friendly, a response from them should not occur. A narrow directed beam is achieved by using a directional antenna system which makes use of both sum and difference patterns from a set of antenna elements that are arranged in a prescribed array. The beamwidths of the narrow beam is in the range of only a few degrees and it is established by radiating a sum and a difference patterns in a time diverse manner. In general, it is desirable to have as narrow a beam as possible provided that the beam does not become so narrow that the target is not covered.

Interrogator azimuth discrimination must therefore be sufficiently narrow to keep unintended transponders from responding. In addition, the azimuth discrimination beamwidth cannot be so small as to not fully illuminate (i.e. "cover") the desired transponder (vehicle) being targeted. To facilitate this goal, interrogator side-lobe suppression (ISLS) between the transponder replies received outside of the interrogator's field of view (FOV) may be used. When the antenna array is configured to radiate a sum pattern, basic directivity is established by the radiated sum pattern. When the antenna array is configured to radiate a difference pattern, a radiation null is observed to exist in the array's bore-sight aiming direction. In this manner, the difference pattern provides the ISLS beam sharpening. To provide ISLS for azimuth displacements off of bore-sight, the use of a constant envelope pattern of an Omni-directional antenna is employed.

Tables 1 and 2 below present a link margin analysis for the IAS to TAS air to ground link and for the TAS to IAS response link from the transponder on the ground back to the airborne interrogator. These budgets are for clear day conditions. Due to the inherent directivity of the IAS antenna system, multipath losses become greatly suppress as compared to the terrestrial interrogation systems where as much as 4.5 dB may be encountered.

TABLE 1

A/G IAS to TAS Link Margin Analysis
Link Margin Analysis IAS to TAS
Three Horn Interrogattor Antgenna System System-to-Omni TAS
Frequency: 37.00 GHz

| Parameter | | | Units | Clear (Spec) Value |
|---|---|---|---|---|
| Tx Output Power | RTN | IAS | dBm | 22.00 |
| Waveguide Interface Loss | | | dB | −1.00 |
| Interrogator Antenna Gain | | | dBi | 23.50 |
| Antenna Pointing Loss | | | dB | −1.00 |
| Polarization Loss | | | dB | −0.46 |
| EIRP | RTN | IAS | dBm | 43.04 |
| Range | | | km | 5.50 |
| Free-Space Path Loss | | | dB | −138.62 |
| Multipath Fading Loss | | | dB | 0.00 |
| Rain Attenuation Calculation: | | | | |
| k @ (center freq; circular) | | | | 0.30 |
| alpha (@ center freq; circular) | | | | 0.95 |
| path length reduction factor | | | | 0.78 |
| Rain Rate | | | mm/h | 0.00 |
| Rain Attenuation | | | dB/km | 0.00 |
| Rain Attentuation | | | dB | 0.00 |
| Atmospheric Attenuation Calculation: | | | | |
| Relative Humidity | | | % | 50.00 |
| Air Temperature | | | deg C. | 25.00 |
| Water Vapor Concentration | | | g/m^3 | 11.51 |
| Oxygen Attenuation | | | dB/km | 0.03 |
| Water Attenuation | | | dB/km | 0.13 |
| Atmospheric Attenuation | | | dB/km | 0.16 |
| Atmospheric Attenuation | | | dB | −0.88 |
| Radiation Fog Attenuation Calculation: | | | | |
| Fog Specific Atten. Coeff. | | | | 0.00 |
| Cloud Liquid Water Content | | | g/m^3 | 0.00 |
| Cloud Attenuation | | | dB/km | 0.00 |
| Radiation Fog Attenuation | | | dB | 0.00 |
| Total Atmos., Rain, Fog Attn: | | | dB | −0.88 |
| Transponder Antenna Gain | RTN | TAS | dBi | 0.00 |
| Rx Cable Length | | | ft | 0.00 |
| Rx Waveguide Mast. Interface | | | dB | −1.50 |
| Rx Connector Loss | | | dB | 0.00 |
| Received Signal Power C | | | dBm | −97.96 |
| Atmospheric Noise Temperature | | | deg. K | 298.00 |
| Jamming Noise | | | deg. K | 0.00 |
| Receiver Noise | 6.50 | dB NR => | deg. K | 1,033.12 |
| Total System Temperature | | | deg. K | 1,331.00 |
| Noise Density No | | | dBm/Hz | −167.36 |
| Received C/No | | | dB-Hz | 69.40 |
| Synthesizer Spur Loss | | | dB | −0.10 |
| Phase Noise Loss | | | dB | −0.70 |
| Modem Implementation Loss | | | dB | −2.50 |
| Doppler Loss | | | dB | −1.00 |
| Total Implementation Losses | | | dB | −4.30 |
| Net C/No | | | dB-Hz | 65.10 |
| | Data Rate | | kbps | 156.25 |
| Received Eb/No | | | dB | 13.16 |
| Required Eb/No | | | dB | 6.80 |
| Unallocated Margin | | | dB | 6.36 |

TABLE 2

G/A TAS to IAS Link Margin Analysis
Link Margin Analysis G/A TAS to IAS
Frequency: 37.00 GHz

| Parameter | | | Units | Clear (Spec) Value |
|---|---|---|---|---|
| Tx Output Power | RTN | IAS | dBm | 27.50 |
| Waveguide Interface Loss | | | dB | −1.50 |
| Transponder Antenna Gain | | | dBi | −1.00 |
| Antenna Pointing Loss | | | dB | 0.00 |
| EIRP | RTN | TAS | dBm | 24.54 |
| Range | | | km | 5.50 |
| Free-Space Path Loss | | | dB | −138.62 |
| Polarization Loss | | | dB | −0.46 |
| Atmospheric Attenuation Calculation: | | | | |
| Relative Humidity | | | % | 50.01 |
| Air Temperature | | | deg C. | 25.00 |
| Water Vapor Concentration | | | g/m^3 | 11.51 |
| Oxygen Attenuation | | | dB/km | 0.03 |
| Water Attenuation | | | dB/km | 0.13 |
| Atmospheric Attenuation | | | dB/km | 0.16 |
| Atmospheric Loss | | | dB | −0.88 |
| Interrogator Antenna Ga | RTN | IAS | dBi | 18.50 |
| Antenna Pointing Loss | | | dB | −1.00 |
| Rx Waveguide Mast. Interface | | | dB | −1.00 |
| Rx Connector Loss | | | dB | 0.00 |
| Received Signal Power C | | | dBm | −97.46 |
| Atmospheric Noise Temperature | | | deg. K | 298.00 |
| Jamming Noise | | | deg. K | 0.00 |
| Receiver Noise | 6.50 | dB | deg. K | 1,033.12 |
| Total System Temperature | | | deg. K | 1,331.00 |
| Noise Density No | | | dBm/Hz | −167.36 |
| Received C/No | | | dB-Hz | 69.90 |
| Synthesizer Spur Loss | | | dB | −0.10 |
| Phase Noise Loss | | | dB | −0.70 |
| Modem Implementation Loss | | | dB | −2.50 |
| Doppler Loss | | | dB | −1.00 |
| Total Implementation Losses | | | dB | −4.30 |
| Net C/No | | | dB-Hz | 65.60 |
| Data Rate | | | kbps | 156.25 |
| Received Eb/No | | | dB | 13.66 |
| Required EB/No | | | dB | 6.80 |
| Unallocated Margin | | | dB | 6.86 |

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims.

The invention claimed is:

1. An antenna system comprising:
a first antenna corresponding to a horn antenna;
a second antenna corresponding to a horn antenna disposed such that the E-plane of the second antenna is co-planar with the E-plane of the first antenna and such that an effective electrical aperture of the first antenna and an effective electrical aperture of the second antenna are substantially in a common plane; and
a third antenna corresponding to a horn antenna disposed such that the E-plane of the third antenna is substantially co-planar with the E-plane of the first antenna and such that an effective electrical aperture of said third antenna is substantially in the same plane as the effective electrical apertures of the first and second antennas and wherein the second and third antennas are canted toward each other from feed ends to aperture ends of the second and third antennas,
wherein the second and third antennas are disposed such that a central longitudinal axis of the second antenna and a central longitudinal axis of the third antenna cross at an angle of about 10 degrees,
wherein the first, second and third antennas are configured with their apertures substantially in a common plane to achieve a specific sum and difference set of radiation patterns where, for an angular range from substantially from +55° to −55° displacement from the boresight, the sum pattern is greater in signal strength than the difference pattern only at the boresight azimuth angle of 0± a defined and limited angular tolerance.

2. The system of claim 1 wherein said first horn antenna is provided having an pyramidal shape.

3. The system of claim 1 wherein said second horn antenna is provided as a sector horn antenna.

4. The system of claim 1 wherein said third horn antenna is provided as a sector horn antenna.

5. The system of claim 1 wherein:
said first horn antenna is an optimal gain pyramidal horn having an optimal gain configuration;
said second horn antenna is provided as a sector horn antenna; and
said third horn antenna is provided as a sector horn antenna.

6. The system of claim 5 wherein physical apertures of the first, second and third horn antennas are in substantially the same physical plane.

7. The system of claim 1 further comprising a hybrid junction having a first port corresponding to a difference port, a second port coupled to an output port of said second antenna and a third port coupled to an output port of said third antenna wherein a signal fed to the hybrid junction difference port is coupled to each of the second and third hybrid junction ports with substantially equal magnitude but substantially 180 degrees out of phase.

8. An array antenna system comprising a combination of three horn antennas configured with their apertures substantially in a common plane to achieve a specific sum and difference set of radiation patterns where, for an angular range from substantially from +55° to −55° displacement from the boresight, the sum pattern is greater in signal strength than the difference pattern only at the boresight azimuth angle of 0± a defined and limited angular tolerance,
wherein at least two horn antennas of the three horn antennas are canted toward each other from feed ends to aperture ends,
wherein the at least two horn antennas are disposed such that a central longitudinal axis of a first horn antenna and a central longitudinal axis of a second horn antenna cross at an angle of about 10 degrees.

9. The system recited in claim 8 where a primary pyramidal horn antenna is used to generate a sum radiation pattern.

10. The system recited in claim 9 where two canted and sector horn antenna are used to generate a difference radiation pattern.

11. A combination of three horn antennas configured with their apertures in a common plane to achieve a specific sum and difference set of radiation patterns where, for an angular range from substantially from +55° to −55° displacement from the boresight, the sum pattern is greater in signal strength than the difference pattern only at the boresight azimuth angle of 0± a defined and limited angular tolerance,
wherein at least two horn antennas of the three horn antennas are canted toward each other from feed ends to aperture ends, wherein the at least two horn antennas are disposed such that a central longitudinal axis of a first horn antenna and a central longitudinal axis of a second horn antenna cross at an angle of about 10 degrees.

12. The three horn antennas of claim 11 wherein a third horn antenna of the three horn antennas is provided having an pyramidal shape.

13. The three horn antennas of claim 11 wherein the first horn antenna is provided as a sector horn antenna.

14. The three horn antennas of claim 11 wherein the second horn antenna is provided as a sector horn antenna.

15. The three horn antennas of claim 11 wherein:
a third horn antenna of the three horn antennas is an optimal gain pyramidal horn having an optimal gain configuration;
the second horn antenna is provided as a sector horn antenna; and
the third horn antenna is provided as a sector horn antenna.

* * * * *